No. 756,915. PATENTED APR. 12, 1904.
J. B. TUOR.
GLASS PROTECTING ATTACHMENT FOR FAUCETS.
APPLICATION FILED MAY 12, 1902.
NO MODEL.
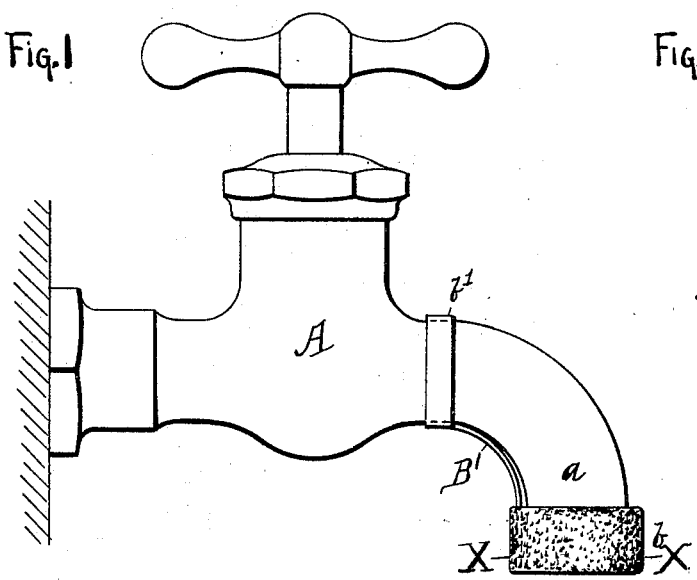
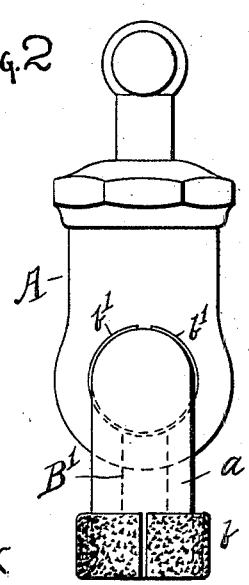
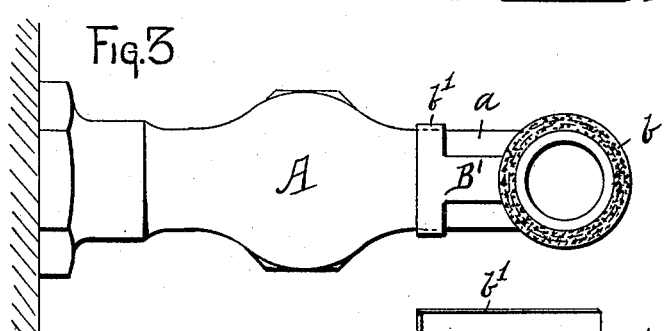
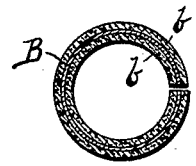
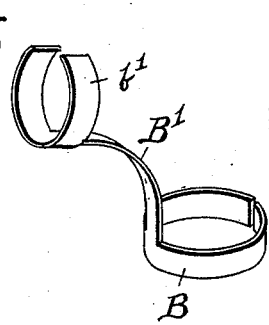
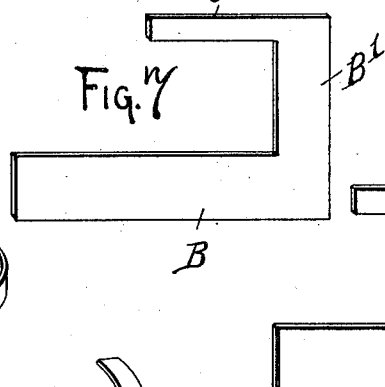
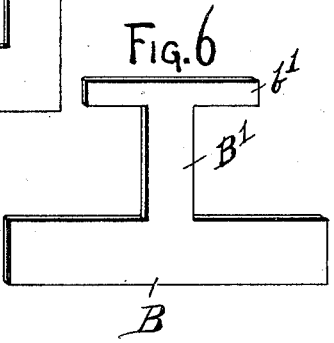
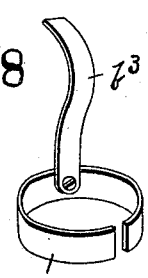
WITNESSES.
G. M. Sheldon.
A. E. Woodward
Joseph B. Tuor. INVENTOR,
BY L. Feeser Jr. ATTORNEY.

No. 756,915.

Patented April 12, 1904.

UNITED STATES PATENT OFFICE.

JOSEPH BENEDICT TUOR, OF ST. PAUL, MINNESOTA.

GLASS-PROTECTING ATTACHMENT FOR FAUCETS.

SPECIFICATION forming part of Letters Patent No. 756,915, dated April 12, 1904.

Application filed May 12, 1902. Serial No. 106,935. (No model.)

*To all whom it may concern:*

Be it known that I, JOSEPH BENEDICT TUOR, a citizen of the United States, residing at St. Paul, in the county of Ramsey and State of Minnesota, have invented certain new and useful Improvements in Glass-Protecting Attachments for Faucets, of which the following is a specification.

The object of this invention is to provide an attachment to faucets from which liquids are to be drawn into glasses or other fragile vessels which shall protect the edge of the glass or other vessel from abrasion or fracture while the liquid is being drawn into it; and the invention consists in a band of rubber or combined metal and rubber removably attached to the discharge end of the faucet, as hereinafter shown and described, and specifically pointed out in the claim.

The attachment will preferably be formed of a band of metal covered with rubber or other suitable material or fabric and supported removably about the lower or discharge end of the faucet and serving to prevent the rims of the glasses or other vessels into which the liquid is drawn from coming in contact with the metal of which the faucet is composed. The fragile material of the vessel is thus protected and all danger of "chipping" or fracturing it avoided.

The metal band, with its rubber or other soft covering, may be attached to the faucet in many ways; but for the purpose of illustration I have shown it in the drawings attached in an approved manner.

In the drawings illustrative of the invention, Figure 1 represents a faucet of the ordinary construction with one of my improved attachments thereon. Fig. 2 is a front view, and Fig. 3 is a bottom plan view, of the same. Fig. 4 is a cross-section on the line X X of Fig. 1 of the attachment disconnected from the faucet. Fig. 5 is a perspective view of the attachment disconnected from the faucet. Fig. 6 is a perspective view of one of the metal supports before it is bent into shape for engagement with the faucet. Figs. 7 and 8 are perspective views of two modified forms of the metal supports.

The device may be attached to any style of faucet, but is more particularly applicable to faucets employed in drawing beer and similar liquids, and in the drawings A represents an ordinary faucet with the discharge end $a$ curving downward, as shown.

The attachment, which is the subject of the present invention, consists of a metal band B, adapted to be clasped around the lower edge of the discharge end $a$ of the faucet and will be entirely inclosed by a coating or jacket of rubber or other suitable soft substance or material $b$, as shown.

The band, with its soft envelop, will be attachable to the faucet in any approved manner, either by a bar or strip B', extending upward from the band B and provided with transverse ends $b'$, adapted to be wrapped around the shank of the faucet, as shown in Figs. 1, 2, 3, and 4, or formed with a spring-bar $b'''$, adapted to engage some projecting part of the faucet, and thus retain the attachment in engagement with the faucet, or any other form of fastening may be employed, as I wish to be understood that I do not wish to be limited to any specific form or construction of the means for supporting the protecting-band in position upon the faucet.

The protecting-bands may be of any size or shape or configuration to adapt them to the different makes of faucet or the fancy of the manufacturer or user.

When used in connection with beer-faucets, the soft covering may be of any fanciful color or in various colors.

Where several grades or qualities or where several different "brews" are drawn in the same room, a different color may be employed for each different brew or grade or make of beer or other liquid, so that the quality or make of the liquid may be readily ascertained and which will also be a means of advertisement.

By the use of this simple device all danger of chipping beer-glasses by striking them against the faucet is avoided and a great saving thereby secured, which is a very great advantage in establishments employing a large number of glasses or other fragile vessels.

Having thus described my invention, what I claim as new is—

In a glass-protector, a head, stem and base, the head being incased and embracing a faucet-spout, the said stem being bent to the contour of the spout and the base forming a spring-clasp encircling the spout.

In testimony whereof I affix my signature in presence of two witnesses.

JOSEPH BENEDICT TUOR.

Witnesses:
L. FEESER, Jr.,
O. E. HOLMAN.